United States Patent

Griffey

[15] 3,700,796

[45] Oct. 24, 1972

[54] D-C COUPLED SYNC CLIPPING VIDEO AMPLIFIER

[72] Inventor: Donald E. Griffey, Skokie, Ill.

[73] Assignee: Motorola, Inc., Franklin Park, Ill.

[22] Filed: July 17, 1970

[21] Appl. No.: 56,247

Related U.S. Application Data

[63] Continuation of Ser. No. 696,163, Jan. 8, 1968, abandoned.

[52] U.S. Cl...................178/7.3 R, 307/230, 330/29, 330/145

[51] Int. Cl.............................H04r 5/20, H04n 5/48

[58] Field of Search.........178/7.3 R, 7.3 DC, 7.5 R, 178/7.5 DC, 7.35, 7.55, DIG. 16; 330/22, 24, 29, 140, 145; 307/264, 268, 230, 235

[56] References Cited

UNITED STATES PATENTS

| | | | |
|---|---|---|---|
| 2,760,008 | 8/1956 | Schade | 330/95 |
| 3,309,617 | 3/1967 | Lancaster et al. | 330/28 |

*Primary Examiner*—Robert L. Richardson
*Attorney*—Mueller and Aichele

[57] ABSTRACT

A diode in series with the emitter of the video output transistor prevents conduction of the transistor during all or the greater portion of the synch pulse. This permits a greater swing of the video information signal coupled to the cathode ray tube of a television receiver.

6 Claims, 1 Drawing Figure

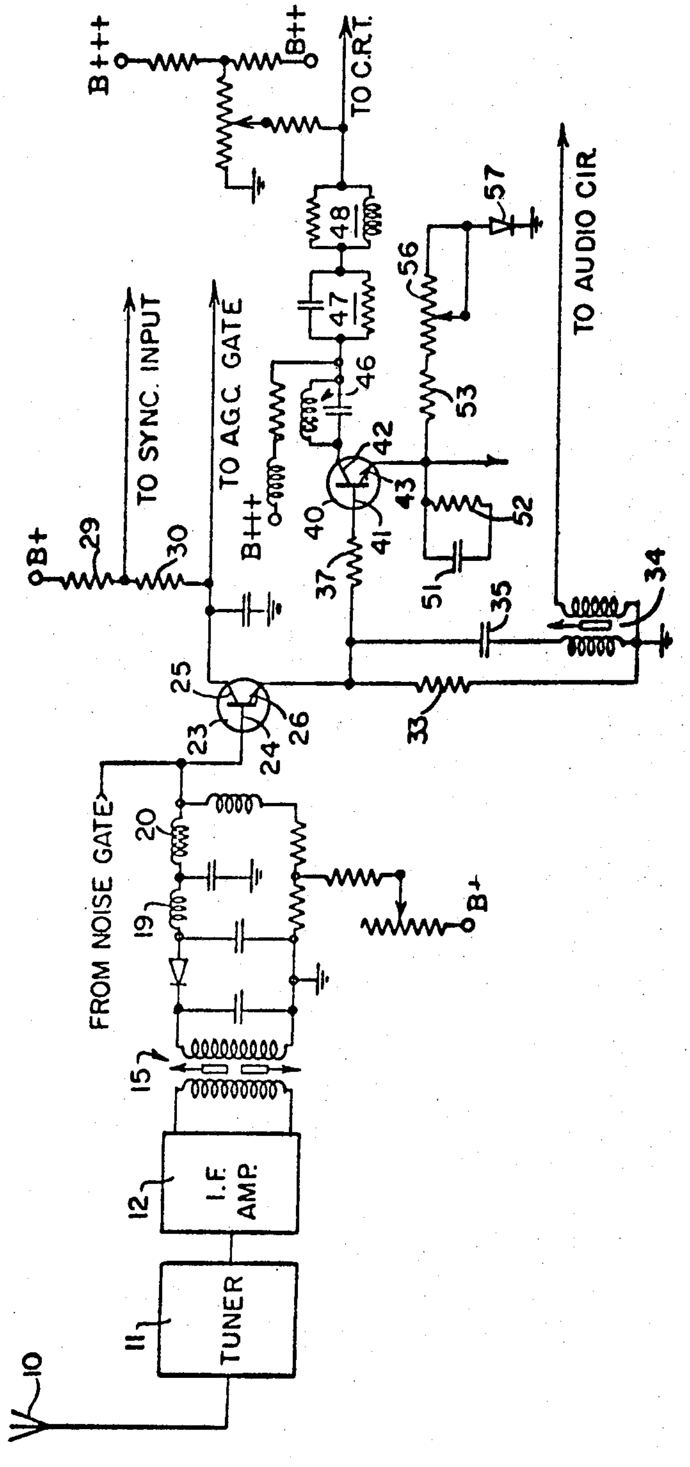
B+++
B++
TO C.R.T.
B+
29
30
TO SYNC. INPUT
TO A.G.C. GATE
B++
47
48
46
42
40
43
41
37
52
51
53
56
57
TO AUDIO CIR.
35
34
33
25
23
24
26
FROM NOISE GATE
20
19
B+
15
12
I.F. AMP.
11
TUNER
10

D-C COUPLED SYNC CLIPPING VIDEO AMPLIFIER

RELATED APPLICATIONS

This application is a continuation of copending application Ser. No. 696,163, filed Jan. 8, 1968, now abandoned.

BACKGROUND OF THE INVENTION

In order to provide a satisfactory contrast range for a television receiver, the swing of the video signal from the video output amplifier should be as great as possible. The swing of the video output signal has been limited, particularly in transistorized receivers, as the synch pulses present in the composite video signal cannot be permitted to cut off the video output amplifier driver stage and the white levels cannot be permitted to drive the video output amplifier into saturation.

The elimination of the synch pulses from the video amplifier would provide more swing, however, it is not possible to do this simply in conventional circuits. Since the video driver stage also amplifies the sound signals the bias on the input to the driver stage must be adjusted so that the synch pulse peaks do not cut off the driver stage. If the synch pulses were permitted to cut off the driver stage a sound buzz would appear in the sound signal which would not be removed by the limiting action of the audio stages. Thus the synch pulses will be amplified in the driver stage and applied to the video output amplifier stage. When DC coupling of the driver and video output is used the video output stage cannot easily be biased to remove the synch pulses, thus they are present in the video output signal and restrict the swing of the video information portion of the video output signal.

SUMMARY OF THE INVENTION

It is, therefore, an object of this invention to provide an improved video amplifier output stage for a transistorized television receiver.

Another object of this invention is to provide a video amplifier output stage for developing a video information signal having an extended swing.

In practicing this invention a diode is coupled in series with the base-emitter circuit of the video output transistor. The diode prevents conduction of the video output transistor during a portion or all of the synch pulse to thereby extend the range of swing available for the video information signal.

The invention is illustrated in the single drawing, a partial schematic and partial block diagram of a portion of a television receiver incorporating the features of this invention.

DESCRIPTION OF THE INVENTION

Referring to the FIGURE, antenna 10 receives television signals which are amplified and detected in tuner 11. The detected signals are amplified in intermediate frequency amplifier 12 and coupled to second detector diode 16 through transformer 15. The output of second detector diode 16 is the composite video signal, including the sound signals, which is coupled to base 24 of transistor 23 through inductances 19 and 20. Collector 25 of transistor 23 is coupled to the B+ supply through resistors 29 and 30. Emitter 26 of transistor 23 is coupled to a reference potential through resistor 33 and the circuit consisting of capacitor 35 and transformer 34. Synch signals are taken from the junction of resistors 29 and 30 and the AGC gate signal is taken from the collector 25 of transistor 23. The audio signal is taken from the secondary of transformer 34.

The output signal developed across resistor 33 is coupled to base 41 of transistor 40 through resistor 37. The video signal developed at collector 42 is coupled through trap 46 and circuits 47, 48 to the cathode ray tube (not shown) where it operates to modulate the electron beam of the cathode ray tube. The bias voltages for transistor 40 are developed across resistor 52 and resistors 53, 56 and diode 57 connected in series between emitter 43 and the reference potential. Capacitor 51 coupled between emitter 43 and the reference potential acts as an alternating current bypass.

Consider the operation of the circuit of the figure, without diode 57 in the circuit, that is, resistor 56 is connected directly to the reference potential. The signal developed at the output of second detector diode 16 is a negative-going signal, that is the white signal level is the most positive while the black signal level is more negative than the white signal. The synch pulse is more negative than the black signal. This composite video signal is coupled to base 24 of transistor 23 and biases transistor 23 to maximum conduction with the composite video signal at the white level and minimum conduction with the composite video signal at the synch level. Since the audio signal is included with the composite video signal, transistor 23 must be biased so that the peaks of the negative-going synch pulses will not bias transistor 23 to cutoff. If the peaks of the synch pulses were permitted to bias off transistor 23, blank intervals would appear in the output audio signal from transistor 23. The limiting circuits of the audio system would not remove the blank intervals and they would be reproduced as an annoying buzz in the audio output.

The composite video signal developed across resistor 33 is coupled to base 41 of transistor 40, the video output transistor. Since transistor 23 is still conducting during the sync pulse period, a sufficient voltage is developed on base 41 to bias transistor 40 to conduction. The maximum positive input signal which can be accepted by transistor 40 is a signal which will not bias transistor 40 into saturation. If the drive signal were made large enough to bias transistor 40 to saturation, the white signal levels would be distorted. Thus the swing of the output signal from the transistor 40 is limited to values between cutoff and the beginning of saturation. Since a portion of this range is taken up by the synch signal pulse, the swing of the video information signal between the black and white levels is restricted.

Resistor 52 has comparatively high value of resistance and in an example of a typical receiver may be of the order of 1.8 k ohms. Resistance 53 may be of the order of 120 ohms while variable resistor 56, which is the constant control, may be of the order of 1,000 ohms. Since the contrast is a function of the maximum swing of the video signal, resistor 56 would be set for maximum contrast in order to achieve the greatest swing. It is at this setting of the contrast control that the signal swings between a value short of saturation to a value just above cutoff.

Since the synch signals have already been removed for use by the synchronizing portions of the television receiver it is not necessary that they be reproduced in the output signal of the video output amplifier. In order to remove all or a portion of the synch pulse from the output of transistor 40, signal diode 57 is coupled between resistor 56 and the reference potential. Diode 57 acts to provide a bias for transistor 40 and conduction of transistor 40 will not take place until the signal applied to base 41 is sufficient to overcome the base-emitter voltage drops of transistor 40 and the voltage drop of diode 57. Some current can flow through transistor 40 and through resistor 52 before this level is reached, however, since resistor 52 is relatively large, this current is negligible and no appreciable output is developed at collector 42 until diode 57 conducts. By delaying conduction with the switching action of the diode 57 until the video signal has reached a higher positive level all or a portion of the synch pulse is removed from the output video signal. This has the effect of lowering the entire video output signal, that is, moving the white level away from saturation without decreasing the total black to white swing of the video output signal. Since the white level is now no longer near the saturation level it can be increased by adjusting variable resistance 27 to bring the white level closer to the saturation point of the transistor. By doing this the swing of the output video signal is increased. While a single diode 57 has been shown, more than one diode or different types of diodes, such as zener diodes, may be substituted therefor to achieve the desired delay in conduction of transistor 40.

Thus a simple circuit has been shown for increasing the swing of the output signal from the video output amplifier of a transistorized television receiver. The circuit is simple and easily implemented with inexpensive components without detriment to the operation of the television receiver.

I claim:

1. In a DC coupled television receiver responsive to composite television signals including video signal components extending over a predetermined useful range of magnitudes and synchronizing signal components having magnitudes outside the predetermined useful range of the video signal components, the television receiver having a circuit for removing the synchronizing signal components including in combination:

a video signal transistor amplifier stage including a transistor having input, output, and common terminals;

means for supplying the composite video signal, including the video signal components and the synchronizing signal components, to the input terminal of the transistor;

means for supplying operating potential to the output terminal of the transistor;

voltage responsive switch means coupled in circuit between the common terminal of the transistor and a point of reference potential, the switch means being normally nonconductive and being rendered conductive in response to signals applied thereto having a magnitude in excess of a predetermined threshold, the threshold being such that the magnitudes of the synchronizing signal components are insufficient to render the switch means conductive, with the switch means being rendered conductive in response to composite video signal components within said predetermined range; and the switch means being connected in the primary signal path of the transistor amplifier stage, so that amplification of signals thereby is substantially prevented until the switch means is rendered conductive.

2. The combination according to claim 1 wherein the switch means is a diode switch means and the input, output, and common terminals of the transistor correspond to base, collector, and emitter terminals, respectively, with the threshold voltage of the diode switch being established by the voltage drop thereacross necessary to initiate conduction therethrough.

3. The combination according to claim 2 further including a contrast control potentiometer coupled in series circuit with the diode switch means between the emitter electrode of the transistor and the point of reference potential.

4. The combination according to claim 2 wherein the diode switch means is poled so that current flowing through the base-emitter junction of the transistor in a forward direction also flows through the diode switch means in a forward direction.

5. The combination according to claim 4 further including resistance means coupled in series circuit with the diode switch means between the emitter of the transistor and the point of reference potential.

6. The combination according to claim 5 wherein the diode switch means includes a single switching diode and the resistance means is a variable contrast control resistance.

* * * * *